United States Patent
Wang et al.

(10) Patent No.: US 7,719,942 B2
(45) Date of Patent: May 18, 2010

(54) POWER CONTROL METHOD FOR ELIMINATING OUTPUT POWER OFFSET OF A PICK-UP HEAD IN AN OPTICAL DISC DRIVE

(76) Inventors: Che-Chieh Wang, 8F, No. 535, Chung-Cheng Rd., Hsin-Tien, Taipei Hsien (TW); Chin-Yin Tsai, 8F, No. 535, Chung-Cheng Rd., Hsin-Tien, Taipei Hsien (TW)

( * ) Notice: Subject to any disclaimer, the term of this patent is extended or adjusted under 35 U.S.C. 154(b) by 1350 days.

(21) Appl. No.: 11/160,738

(22) Filed: Jul. 6, 2005

(65) Prior Publication Data

US 2006/0146669 A1  Jul. 6, 2006

(30) Foreign Application Priority Data

Dec. 31, 2004  (TW) .............. 93141789 A

(51) Int. Cl.
G11B 7/00  (2006.01)

(52) U.S. Cl. ............... 369/53.26; 369/116; 369/47.5

(58) Field of Classification Search .............. None
See application file for complete search history.

(56) References Cited

U.S. PATENT DOCUMENTS

| 5,712,839 | A | * | 1/1998 | Aoki .................. 369/47.52 |
| 6,222,815 | B1 | | 4/2001 | Nagano |
| 6,512,470 | B2 | | 1/2003 | Fwu |
| 7,366,080 | B2 | * | 4/2008 | Senga et al. ............ 369/116 |
| 2003/0099177 | A1 | * | 5/2003 | Wang et al. ............ 369/53.26 |
| 2003/0214893 | A1 | * | 11/2003 | Yang ................... 369/53.26 |
| 2004/0114472 | A1 | * | 6/2004 | Wang et al. ............ 369/13.26 |
| 2005/0036434 | A1 | * | 2/2005 | Lei ...................... 369/116 |

FOREIGN PATENT DOCUMENTS

| CN | 1652220 | 8/2005 |
| TW | 200623089 | 7/2006 |

* cited by examiner

*Primary Examiner*—Lixi Chow
(74) *Attorney, Agent, or Firm*—Perkins Coie LLP

(57) ABSTRACT

A power controlling method for eliminating output power offset of a pick-up head in an optical disc drive. The power control method includes measuring a first predetermined power related to a first predetermined control signal in a predetermined procedure, inputting a test data containing a plurality of first bits and a plurality of second bits, activating a sample/hold circuit to form a close loop so that the first predetermined control signal can be received and utilized for driving a pick-up head to output a first power when the plurality of first bits are received, and calculating an offset power based on the first predetermined power and the first power for rectifying output power of the pick-up head.

10 Claims, 5 Drawing Sheets

POWER CONTROL METHOD FOR ELIMINATING OUTPUT POWER OFFSET OF A PICK-UP HEAD IN AN OPTICAL DISC DRIVE

BACKGROUND OF THE INVENTION

1. Field of the Invention

The present invention relates to a power controlling method of an optical disc drive, and more particularly, to a power controlling method capable of removing an output power shift outputted by a pickup head of an optical disc drive.

2. Description of the Prior Art

For a company or a human, it is important to manage or store a document. In the past, because most documents are printed or written of otherwise paper-based, if a number of the documents is huge, the documents are inconvenient to users because of their weights and volumes. Recently, as computer technology progresses, digital data is widely utilized and stored in a computer storage medium. Many types of data storage devices have been invented to assist users by simplifying digital data storage. For example, the compact disc recorder was invented. The above-mentioned compact disc recorder, such as a CD-R drive or a CD-RW drive, can store data into a CD-R disc or a CD-RW disc. Because the optical disc has the advantages of low cost, small volume, and big capacity, the users can preserve data more easily. Before writing data into a CD-R disc, the CD-R drive must perform an optimum power control (OPC) procedure to find out an optimum recording power of the CD-R disc. Furthermore, the compact disc recorder performs a burning operation on the CD-R disc according to the optimum recording power to form corresponding pits to store binary data "0". And the other flat area is utilized to store binary data "1". For the above-mentioned CD-RW disc drive, the above-mentioned optimum recording power can be utilized as an erase power of the CD-RW disc drive, where the erase power is utilized to reform a CD-RW disc to re-uniform the surface of a recording layer of the CD-RW disc to be flat.

Please refer to FIG. 1, which is a block diagram of a power controlling system 10 of a CD-R disc drive according to the prior art. The power controlling system 10 encompasses a controller 12, a power control unit 14, a pickup head 16, and a transformer 18. The controller 12 is utilized to control operations of the power controlling system 10. The power control unit 14 is utilized to adjust an output power of the pickup head 16 to write data into a CD-R disc, where the power control unit 14 includes a sample/hold circuit 20, a digital-to-analog converter (DAC) 22, and a driving circuit 24. The sample/hold circuit 20 is utilized to control the pickup head 16 and the power control unit 14 as a close loop or an open loop. The DAC 22 is utilized to transform a digital control signal 26 to an analog control voltage 28. The driving circuit 24 then outputs a control voltage 30 according to the control voltage 28 in order to drive the pickup head 16 to generate a laser having a predetermined power. Therefore, the pickup head 16 can adjust its output power according to the control voltage 30 generated by the power control unit 14. Furthermore, when the pickup head 16 writes data into the CD-R disc, the variation of the output power of the pickup head 16 is detected. Furthermore, the pickup head 16 of the power controlling system 10 emits an incident pulse to etch the optical disc. The incident pulse is then reflected by the optical disc to form a reflected pulse. The reflected pulse has a reflected pulse level (also called as B-level in the specification) to represent the etching degree of the optical disc. Next, the transformer 18 generates a corresponding feedback signal 32 to the power control unit 14 according to the reflected pulse level (here, the reflected pulse level can correspond to the current output power of the pickup head 16) in order to further adjust the output power of the pickup head 16. If the control signal 26 corresponds to the optimum recording power then the output power of the pickup head 16 can be adjusted to be close to the optimum recording power through the control of the close-loop of the pickup head 16 and the power control unit 14. At this point, the optimum recording power can be outputted through the pickup head 16 in a stable fashion.

The operation of the power control system 10 of the CD-R disc drive is illustrated as follows. The pickup head 16 can emit lasers to etch the recording layer of the optical disc in order to store data. The characteristics of different optical discs may be different. For example, the recording layers of different types of optical discs may be different because of the materials utilized in their manufacture. In other words, the recording layers of different types of the optical discs may have different absorbing layer characteristics. Therefore, it is not sufficient to simply emit the same power to different optical disc. Emitting the same power may result in unwanted variations of the etching degrees. As mentioned above, when producers manufacture optical discs, the producers will store a needed recording power of a specific optical disc in a lead-in area of the specific optical disc. Furthermore, the power controlling system 10 often utilizes an optimum power control (OPC) process to obtain the recording power P1 of the optical disc. Once the power controlling system 10 has obtained the recording power P1, the recording power P1 can be utilized to record data in the recording layer of the optical disc. The power controlling system 10 simultaneously obtains the corresponding relationships between the output power of the pickup head 16 and the control signal 26, according to the specifications of the digital-to-analog converter 22 and the pickup head 16. For example, when the control signal 26 is DAC1 (this also means that the control voltage 28 is the voltage V1), the ideal output power of the pickup head 16 is P1, however, the real output power of the pickup head is P2. The output power P2 is transformed by the transformer 18 to generate the feedback signal 32 corresponding to a voltage V2. Because the pickup head 16 must etch the optical disc to store data (in order to store the binary data "0"), the controller 12 turns on the sample/hold circuit 20 to cause the pickup head 16 and the power control unit 14 to form a close loop. Because the voltage V2 of the feedback signal 32 is not the same as the voltage V1 of the control voltage 28, the driving circuit 24 adjusts the control voltage 30 according to the voltages V1 and V2 until the voltages of the feedback signal 32 and the control voltage 28 are the same. Therefore, the pickup head 16 can etch the optical disc by outputting, in a stable fashion, the power P1. Therefore, every time the output power of the pickup head 16 is not stable and far from the output power P1, the close loop of the power control unit 14 and the pickup head 16 can adjust the output power of the pickup head 16 through the driving circuit to make the output power return the needed optimum recording power P1. As a result, the data writing operation can be performed correctly.

However, in the actual circuit, because the sample/hold circuit 20 encompasses capacitors and/or other different electronic devices, the sample/hold circuit 20 influences the input signal. In an ideal situation, when the sample/hold circuit 20 is turned on to cause the pickup head 16 and the power control unit to form a close loop, the sample/hold circuit 20 can be utilized to hold the feedback signal 32 inputted by the transformer 18. Unfortunately, in the actual operation of writing data, the sample/hold circuit 20 performs corresponding on/off operations according to the write-in data. The outputted signal will be affected because the sample/hold circuit 20 is self-influenced by its own operation. In other words, the feedback signal 32 outputted by the sample/hold circuit 20 may vary from the normal. The result is a shift in the output power of the pickup head 16 due to this variation in the feedback signal 32 inputted into the driving circuit 24.

Please refer to FIG. 2 and FIG. 3. FIG. 2 is a diagram of the output power of the pickup head 16 shown in FIG. 1. FIG. 3 is an operational timing diagram of sample/hold circuit 20 shown in FIG. 1. Assume that the CD-R disc drive 10 must output lasers having the power P1 to etch an optical disc to store the binary data "0" in time T1, T2, T3, and T4. The CD-R disc drive 10 must utilize the recording power P1 to etch an optical disc to store a binary data "0". This operation requires that in time T1, T2, T3, and T4, the sample/hold circuit 20 also be simultaneously turned on such that the pickup head 16 and the power control unit 14 can form a close loop to regulate the output power of the pickup head. However, because the sample/hold circuit 20 comprises capacitors or other electronic devices, frequently turning the sample/hold circuit 20 on and off will result in the above-mentioned operation wrongly influencing the actual output signal of the sample/hold circuit. The result is that the feedback signal 32 inputted into the driving circuit 24 shifts and then influences the output power of the pickup head 16 to move away from the predetermined power P1. For example, assume that the sample/hold circuit 20 is always turned on instead of being turned on and off frequently. Also, assume that the value of the input control signal 26 is 10 and the control signal 26 can drive the pickup head 16 to stably output lasers having a power 50 mW. Furthermore, when executing an actual data storing operation, if the CD-R disc drive 10 inputs a control signal 26 of value is 100 into the DAC 22, the control signal 26 is transformed into the corresponding control voltage 28, whose voltage is V1. However, when the pickup head 16 starts to operate, the pickup head 16 may only output lasers having the power 45 mW because of its characteristics. Therefore, when the pickup head 16 detects the pulse signals reflected from the optical disc, the pulse signals can be transformed into a feedback signal 32, whose voltage value is V2, through the transformer 18.

When the feedback signal 32 is inputted into the sample/hold circuit 20 and utilized to adjust the output power of the pickup head 16 through the above-mentioned close loop, the sample/hold circuit 20 makes the feedback signal 32 shift to voltage V1 instead of the original voltage V2 because the sample/hold circuit 20 is turned on and off frequently. With respect to the driving circuit 24, the output power of the pickup head 16 is not adjusted through the driving circuit 24 because the outputs of the sample/hold circuit 20 and the DAC 22 are the same. Therefore, the pickup head 16 stably outputs lasers having 45 mW power instead of the required output power 50 mW. Apparently, because of the influence of the sample/hold circuit 20, an offset Δp between the predetermined output power P1 and actual output power P2 of the pickup head 16 is generated (of course, according to the circuit characteristic of the sample/hold circuit 20, the actual output power P2 of the pickup head 16 may be greater than the predetermined power P1). In the actual operation of writing data, the CD-R disc drive 10 can utilize the control signal corresponding to the optimum power, generated through the OPC procedure, to drive the pickup head 16. Unfortunately, the sample/hold circuit 20 causes the actual power of the pickup head 16 to shift from the optimum power; the etching degree of the optical disc and the stored data are both negatively influenced. Therefore, when the optical disc is utilized to read stored data, the data may be read incorrectly because of the incorrect etching degree.

For a prior art CD-RW disc drive, the CD-RW disc drive can be utilized to perform a data writing and a data erasing operation on a CD-RW disc. The pickup head of the CD-RW disc drive needs a writing power to etch the optical disc to generate holes on the optical disc. Furthermore, it needs an erasing power to remove the data on the optical disc (that is, the erasing power is utilized to reform the recording layer of the optical disc in order to re-uniform the surface of the optical disc so that the data can be removed). As known by those skilled in the art, the operation and the structure of the CD-RW disc drive when outputting the erasing power is the same as the operation and the structure of the CD-R disc drive 10. In other words, the erasing power is stabilized through a close loop. That is, the erasing power is utilized to form a land on the optical disc. In addition, the CD-RW disc drive turns on the sample/hold circuit to form the close loop. Therefore, like the CD-R disc drive 10, the CD-RW disc drive utilizes the control signal corresponding to the predetermined erasing power; however, because the sample/hold circuit 20 may shift the output power of the pickup head, the data writing operation is also negatively influenced.

SUMMARY OF THE INVENTION

According to an exemplary embodiment of the claimed invention, a power controlling method for controlling a power utilized by an optical disc drive to write data into an optical disc is disclosed. The power controlling method comprises: executing a first predetermined procedure to obtain a first predetermined control signal corresponding to a first predetermined control signal needed by a pickup head to record the data into the optical disc; inputting a test data having a plurality of first bits with a first voltage level and a plurality of second bits with second voltage level; when receiving the first bits with the first voltage level, driving the pickup head to output a first power according to the first predetermined control signal; calculating a difference between the first power and the first predetermined power; and executing a second predetermined procedure to obtain a second predetermined control signal corresponding to a second predetermined power needed by the pickup head to write the data into the optical disc, and adjusting the second predetermined power according to the difference to generate a third predetermined power; wherein a third predetermined control signal corresponds to the third predetermined power, and the first power and a difference between the first power and the first predetermined power is equivalent to a difference between the second predetermined power and the third predetermined power.

According to another exemplary embodiment of the claimed invention, a power controlling method for controlling a power utilized by an optical disc drive to write data into an optical disc is disclosed. The power controlling method comprises: executing a first predetermined procedure to obtain a first predetermined control signal corresponding to a first predetermined control signal needed by a pickup head to record the data into the optical disc; inputting a test data comprising a plurality of first bits with a first voltage level and a plurality of second bits with a second voltage level; when receiving the first bits with the first voltage level, driving the pickup head to output a first power according to the first predetermined control signal; calculating a difference between the first power and the first predetermined power; and executing a second predetermined procedure to obtain a second predetermined control signal corresponding to a second predetermined power needed by the pickup head to write the data into the optical disc, and adjusting the second predetermined power according to the difference to generate a third predetermined power; wherein a third predetermined control signal corresponds to the third predetermined power, and the first power and a difference between the first power and the first predetermined power is equivalent to a difference between the second predetermined power and the third predetermined power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
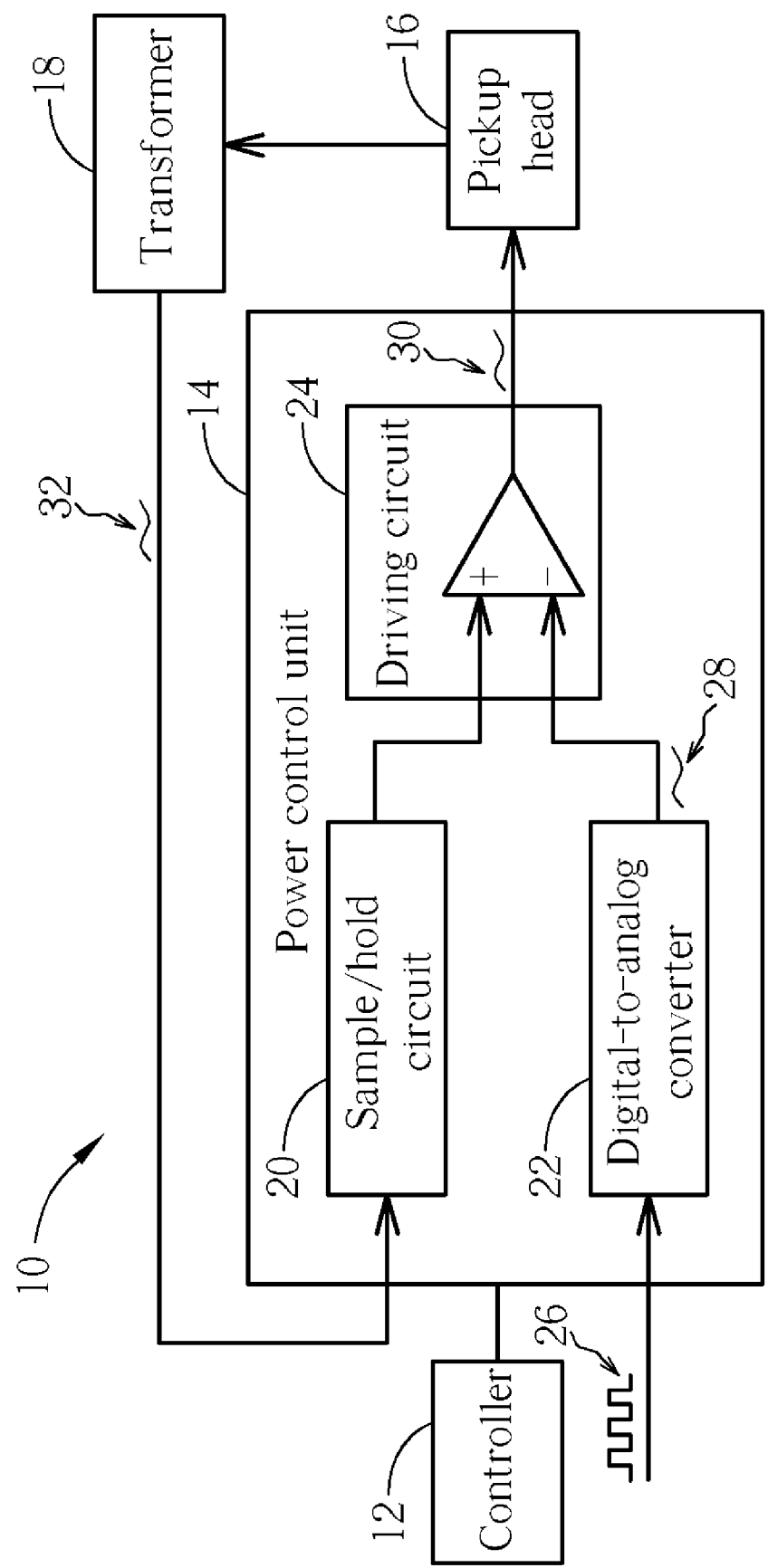
FIG. 1 is a block diagram of a power controlling system of a CD-R disc drive according to the prior art.
Figure 2:
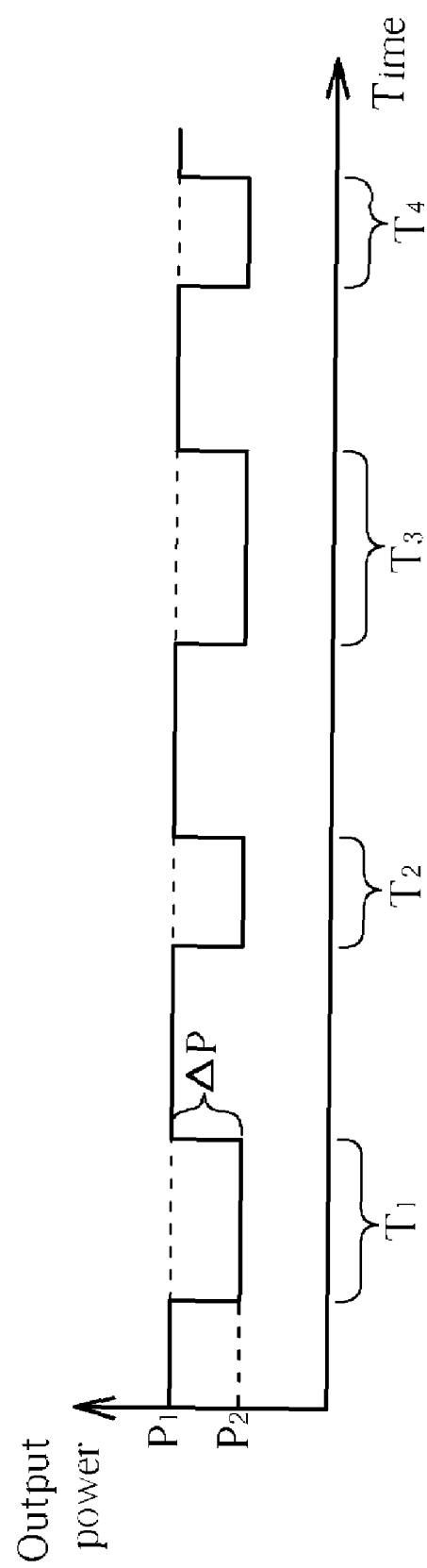
FIG. 2 is a diagram of the output power of the pickup head shown in FIG. 1.
Figure 3:
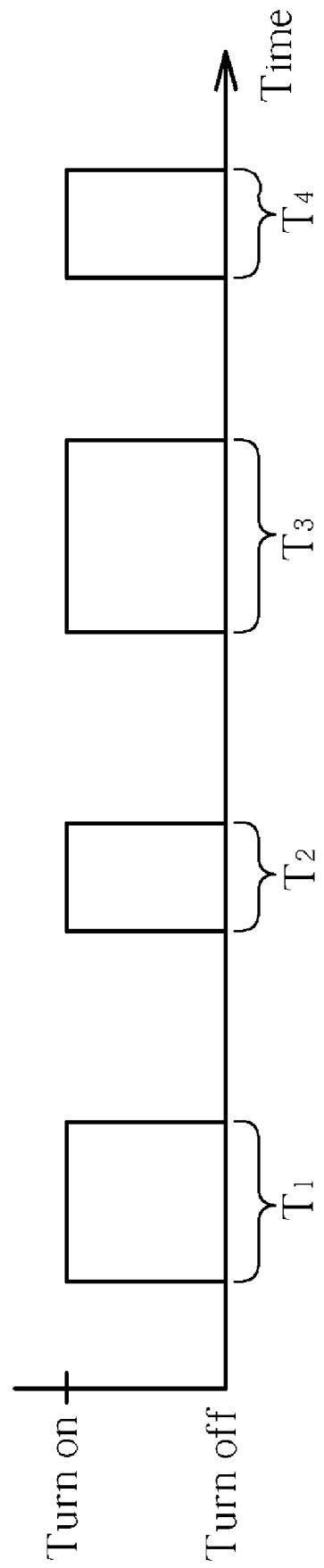
FIG. 3 is an operational timing diagram of sample/hold circuit shown in FIG. 1.
Figure 4:
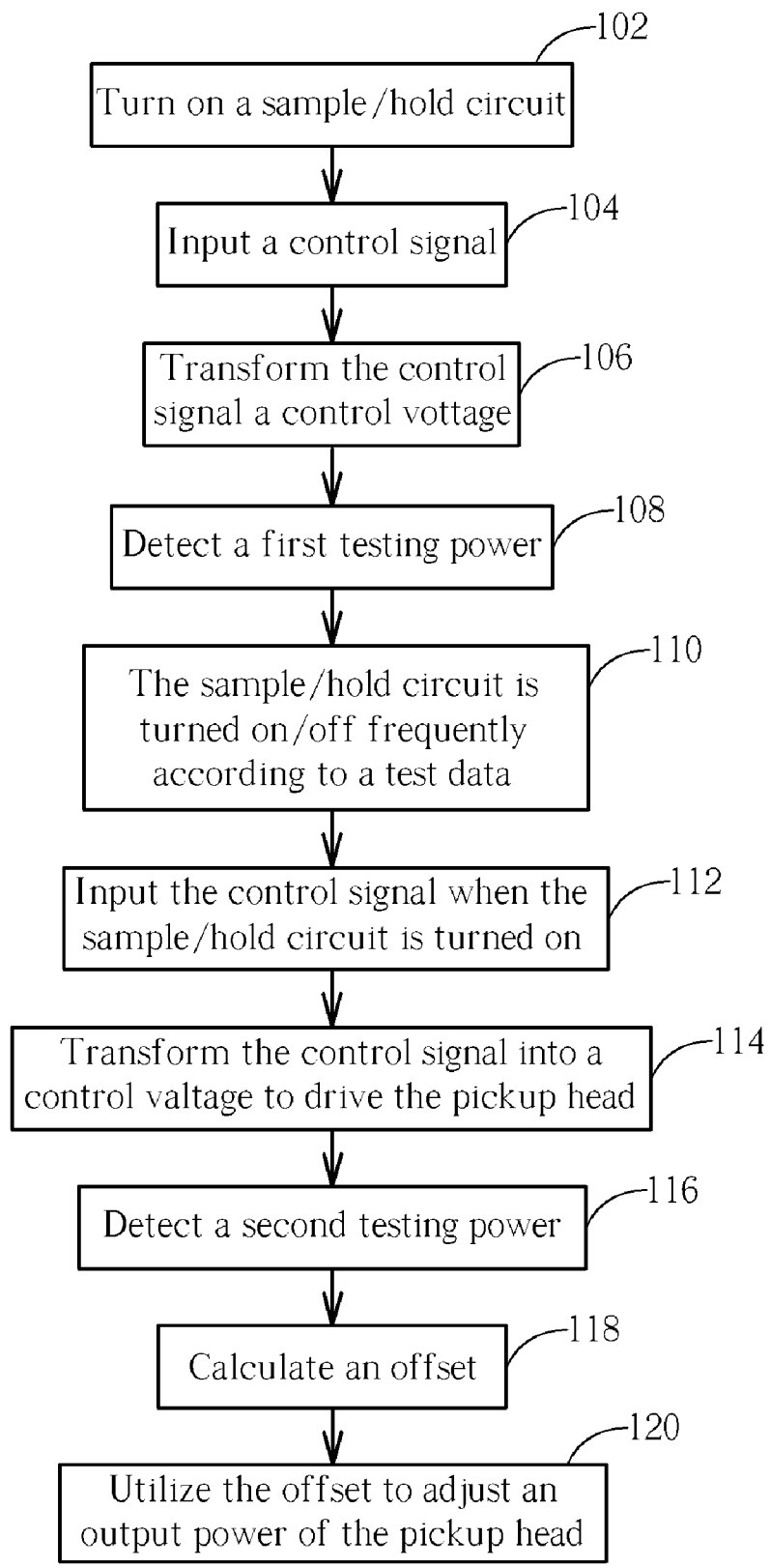
FIG. 4 is a flow chart of the power controlling method according to the present invention.
Figure 5:
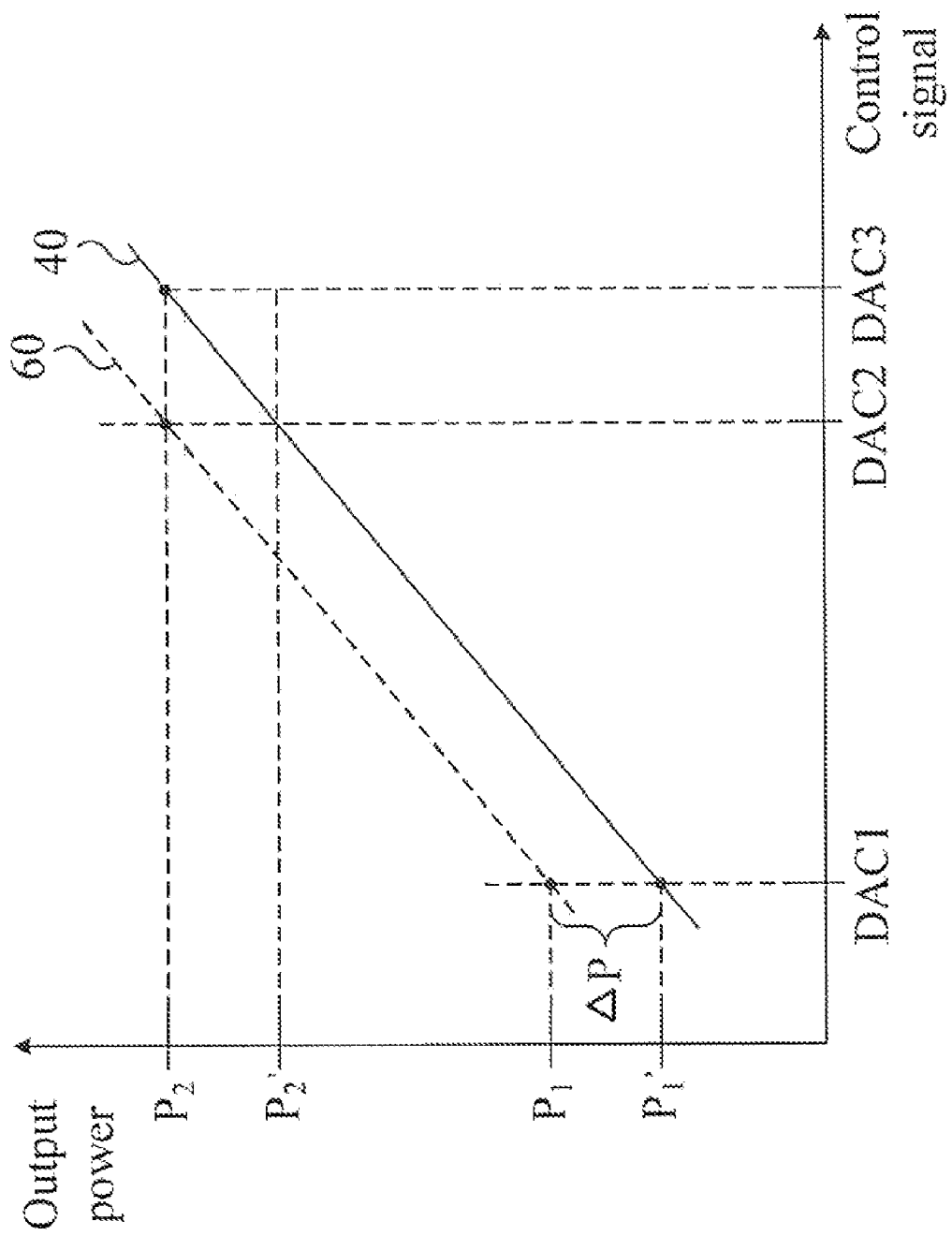
FIG. 5 is a characteristic diagram of the pickup head utilizing the present invention power controlling method.

Please refer to FIG. 4 and FIG. 5 in conjunction with FIG. 1. FIG. 4 is a flow chart of the power controlling method according to the present invention. FIG. 5 is a characteristic diagram of the pickup head 16 utilizing the present invention power controlling method. The present invention power controlling method is to turn on the sample/hold circuit 20 in a first test time (step 102) to make the pickup head 16 and the power control unit 14 form a close loop and to cause the output end of the sample/hold circuit 20 hold the signal of the input end. Additionally, the control signal 26 (shown as DAC1 in FIG. 5) is inputted into the DAC 22 and is transformed into an analog control voltage 28 by the DAC 22 (step 104). Next, the analog control voltage 28 is inputted into the driving circuit 24. The driving circuit 24 generates a control voltage 30 to drive the pickup head 16 (step 106), and the pickup head 16 also detects the output power (step 108), which is shown as the power P1 in FIG. 5. However, in the preferred embodiment, the method further makes the sample/hold circuit 20 frequently turning on and off according to a test data (step 110). For example, the present invention power controlling method is to input an eight-to-fourteen modulation (EFM) data into the CD-R disc drive 10, wherein the EFM data is a bit stream comprising a plurality of digital bits "0" and "1". For the power controlling system 10, when the digital bit "1" is being stored, the sample/hold circuit is turned off, and when the digital bit "0" is being stored, the sample/hold circuit is turned on. Therefore, in the second testing time, the sample/hold circuit 20 is turned on and off according to the EFM data. When the sample/hold circuit 20 is turned on, the control signal 26 (shown as the signal DAC1 in FIG. 5) is inputted into the DAC 22 (step 112). The DAC 22 transforms the digital control signal 26 into an analog control voltage 28. Here, the analog control voltage 28 is then inputted into the driving circuit 24 where the driving circuit 24 generates a control voltage 30 to drive the pickup head (step 114). Furthermore, the pickup head 16 also detects the output power (step 116), which is shown as the power P1' in FIG. 5.

As mentioned above, when the sample/hold circuit 20 is frequently turned on/off according to the data, the actual output power P1' of the pickup head 16 shifts because of the influence of the sample/hold circuit 20. In FIG. 5, the predetermined power is P1, and the offset between the actual output power P1' and the predetermined power P1 is $\Delta P$ (step 118). Therefore, the influence of the sample/hold circuit 20 on the output power of the pickup head 16 is thus obtained. Obviously, when the power controlling system 10 actually writes data into the recording layer of an optical disc, the offset $\Delta P$ can be utilized to adjust the output power of a control signal (step 120).

For example, when the power controlling system 10 performs the above-mentioned power adjustment in a power calibration area (PCA) of an optical disc the following events occur. The sample/hold circuit 20 is turned on to make the pickup head 16 and the power control unit 14 form a close loop. Next, the pickup head of the power controlling system 10 reads an indicative optimum recording power from a lead-in area, wherein the indicative recording power is the optimum recording power indicated by the manufacturers of the disc. In addition, the pickup head 16 performs a write testing operation on a continuous sequence of test blocks of the test area on the optical disc by utilizing seven writing powers that are less than the optimum recording power, the optimum recording power, and seven recording powers that are larger than the optimum recording power. If the optimum recording power of the OPC is P2 then the corresponding control signal 26 is DAC2 according to FIG. 5. Unfortunately, in the actual operation of writing data, the sample/hold circuit 20 usually influences the output power P2. Therefore, in this embodiment, the offset $\Delta P$ is utilized to calculate the actual output power P2' of the pickup head 16 (i.e. P2–$\Delta P$).

In addition, the present invention can also obtain the characteristic curve 40 according to values DAC1 and DAC2 of the control signal 26 and actual output powers P1' and P2' when the pickup head 16 is influenced by the sample/hold circuit 20. This represents the function relationship between the output power and the control signal of the pickup head 16 when the CD-R disc drive 10 actually writes data onto an optical disc. Therefore, from the characteristic curve 40 shown in FIG. 5, when the recording power is P2 the control signal 26 is DAC3. Generally speaking, within the same CD-R disc drive 10, the sample/hold circuit 20 has almost the same influence (the above-mentioned offset $\Delta P$) on the pickup head. Therefore, in this embodiment, the present invention can utilize two testing results, the coordinates (DAC1, P1') and (DAC2, P2'), to quickly establish a characteristic curve 40. The sample/hold circuit 20 is first turned on and remains on while a characteristic curve of the CD-R disc drive 10 is obtained through a test operation. The offset $\Delta P$ is utilized to shift the characteristic curve that is the result obtained through the above-mentioned test operation. Finally, the actual characteristic curve 40 is obtained. For example, the coordinates (DAC1, P1) and (DAC2, P2) or many other testing results may be utilized to obtain a reference characteristic curve (such as the curve 60 shown in FIG. 5) through the prior art polynomial curve fitting method. Next, the offset $\Delta P$ is utilized to shift the reference characteristic curve to obtain the characteristic curve 40. This modification obeys the spirit of the present invention. Please note that the characteristic curve 40 can be also generated by utilizing a prior art polynomial curve fitting method.

Similarly, for the CD-RW disc drive, the control of the erasing power is the same as the control of the recording power of the CD-R disc drive 10. When the CD-RW disc drive erases the binary data "0", it will turn on the sample/hold circuit 20 to form a close loop. When the CD-RW disc drive stores a binary data "1", the sample/hold circuit 20 is turned off. Therefore, for a specific binary data, the sample/hold circuit 20 also has to be turned on and off according to the specific binary data. As known by those skilled in the art, the recording power is generated according to the erasing power. Therefore, the present invention power controlling method can be utilized in the CD-RW disc drive to remove the influence of the sample/hold circuit on the erasing power when the data of the optical disc is erased. Furthermore, a characteristic curve of an adjusted erasing power and a corresponding control signal can be obtained according to the above-mentioned power controlling method. Regardless of a CD-R or CD-RW disc drive, or any other equivalent changes, these modifications all obey the spirit of the present invention.

In contrast to the prior art, the present invention power controlling method first turns on a sample/hold circuit of an optical disc drive and outputs a control signal to drive a pickup head. At the same time, the present invention detects a corresponding predetermined output power, and then outputs a test data into the optical disc drive, and drives the optical disc drive to simulate an actual recording operation according to the control signal. For a CD-R disc drive, the control signal corresponds to a recording power or an erasing power. Therefore, the sample/hold circuit is turned on and off according to the test data. Simultaneously, the pickup head detects an actual output power, and utilizes a predetermined output power and the actual output power to calculate a power offset. The sample/hold circuit utilizes the power offset to adjust the pickup head. Therefore, the present invention power controlling method can utilize the power offset to adjust the output power of the pickup head to make the pickup head to output an actual output power. At the same time, the present invention can utilize the actual output power of the pickup head and the control signal to obtain an actual characteristic curve. Therefore, through the actual characteristic curve, the optical disc drive can quickly determine the needed control signals according to required writing power (in the application of the CD-R disc drive) and required erasing power (in the application of the CD-RW disc drive). As a result, the data storage efficiency is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power controlling method for controlling a power of an optical disc drive when recording data in an optical disc, the power controlling method comprising:

executing a first predetermined procedure to obtain a first predetermined control signal corresponding to a first predetermined power needed by a pick-up head to record the data in the optical disc;

receiving data comprising a plurality of first bits with a first voltage level and a plurality of second bits with a second voltage level;

enabling a sample/hold circuit of a power control unit upon receiving the first bits with the first voltage level to make the pick-up head and the power control unit form a closed loop;

providing the first predetermined control signal to the power control unit to cause it to generate a first control voltage to drive the pick-up head to output a first power;

providing a first control signal to drive the pickup head to output a power substantially equivalent to a first test power;

providing a second control signal to drive the pickup head to output a power equal to a second test power;

establishing a first comparing curve according to the first and second control signals and corresponding the first test power and the second test power, wherein the first comparing curve represents a function relationship between control signals of an digital-to-analog converter and the output powers of the pickup head;

calculating a difference between the first power and the first predetermined power utilizing a second comparing curve to calculate a control signal corresponding to an optimum recording power, wherein the first predetermined power is utilized as the optimum recording power to record the optical disc, wherein the second comparing curve is generated by utilizing the difference to shift the first comparing curve; and adjusting a second predetermined power to generate a third predetermined power according to the difference when the optical disc drive executes a second predetermined procedure to obtain a second predetermined control signal corresponding to the second predetermined power needed by the pick-up head to record the data in the optical disc, wherein the second predetermined procedure is configured to utilize the first comparing curve to determine the first predetermined control signal corresponding to the first predetermined power, and determine the second predetermined control signal corresponding to the second predetermined power;

wherein a third predetermined control signal corresponds to the third predetermined power, and the difference between the first power and the first predetermined power is substantially equivalent to a difference between the second predetermined power and the third predetermined power.

2. The power controlling method of claim 1, wherein the first predetermined control signal corresponds to the first power, and the second predetermined control signal corresponds to the third predetermined power in the second comparing curve.

3. The power controlling method of claim 1, wherein the first predetermined power is an erase power utilized by the optical disc drive for erasing data stored in the optical disc.

4. The power controlling method of claim 1, further comprising:

utilizing the second comparing curve to calculate a needed control signal corresponding to the erase power.

5. A power controlling method for controlling a power utilized by an optical disc drive to record data into an optical disc, the power controlling method comprising:

executing a first predetermined procedure to obtain a first predetermined power corresponding to a first predetermined control signal needed by a pickup head to record the data into the optical disc;

receiving data comprising a plurality of first bits with a first voltage level and a plurality of second bits with a second voltage level;

driving the pickup head to output a first power according to the first predetermined control signal when receiving the first bits with the first voltage level;

calculating a difference between the first power and the first predetermined power;

executing a second predetermined procedure to obtain a second predetermined control signal corresponding to a second predetermined power needed by the pickup head to record the data onto the optical disc, and adjusting the second predetermined power according to the difference to generate a third predetermined power;

providing a first control signal to drive the optical disc drive to output a power substantially equivalent to a first test power;

providing a second control signal to drive the optical disc drive to output a power substantially equivalent to a second test power;

establishing a first comparing curve according to the first and the second control signals and corresponding the first and the second test powers, the first comparing curve representing a function relationship between control signals of an digital-to-analog converter and output powers of the pickup head;

utilizing the difference to shift the first comparing curve and generate a second comparing curve, wherein the first predetermined control signal corresponds to the first power and the second predetermined control signal corresponds to the third predetermined power in the second comparing curve; and utilizing a second comparing curve to calculate a needed control signal corresponding to an optimum recording power, wherein the first predetermined power is the optimum recording power utilized by the optical disc drive for recording the optical disc, wherein the second comparing curve utilizes the difference to shift the first comparing curve to generate the second comparing curve;

wherein a third predetermined control signal corresponds to the third predetermined power, and a difference between the first power and the first predetermined power is substantially equivalent to a difference between the second predetermined power and the third predetermined power; and wherein the second predetermined procedure utilizes the first comparing curve to determine the first predetermined control signal corresponding to the first predetermined power and to determine the second predetermined control signal corresponding to the second predetermined power.

6. The power controlling method of claim 5, wherein the first predetermined power is an erase power utilized by the optical disc drive for erasing the optical disc.

7. The power controlling method of claim 5 further comprising:
utilizing the second comparing curve to calculate a needed control signal corresponding to the erase power.

8. The power controlling method of claim 5 further comprising:
enabling a sample/hold circuit of a power control unit to make the pickup head and the power control unit form a closed loop when receiving the first bits with the first voltage level; and
disabling the sample/hold circuit to make the pickup head and the power control unit to form an open loop when receiving the second bits with the second voltage level;
wherein the power control unit is utilized to adjust an output power of the pickup head.

9. An apparatus for controlling power of an optical disc drive during recording, comprising:
means for executing a first predetermined procedure to obtain a first predetermined control signal corresponding to a first predetermined power needed by a pick-up head to record the data in an optical disc;
means for receiving data comprising a plurality of first bits with a first voltage level and a plurality of second bits with a second voltage level;
means for enabling a sample/hold circuit of a power control unit upon receiving the first bits with the first voltage level to make the pick-up head and the power control unit form a close loop;
means for providing the first predetermined control signal into the power control unit to generate a first control voltage to drive the pick-up head to output a first power;
means for calculating a difference between the first power and the first predetermined power;
means for adjusting a second predetermined power to generate a third predetermined power according to the difference when the optical disc drive executes a second predetermined procedure to obtain a second predetermined control signal corresponding to the second predetermined power needed by the pick-up head to record the data in the optical disc;
means for providing a first control signal to drive the pickup head to output a power substantially equivalent to a first test power;
means for providing a second control signal to drive the pickup head to output a power equal to a second test power;
means for establishing a first comparing curve according to the first and second control signals and corresponding the first test power and the second test power, wherein the first comparing curve represents a function relationship between control signals of an digital-to-analog converter and the output powers of the pickup head; and
means for utilizing a second comparing curve to calculate a needed control signal corresponding to an optimum recording power, wherein the first predetermined power is the optimum recording power utilized by the optical disc drive for recording the optical disc, wherein the second comparing curve utilizes the difference to shift the first comparing curve to generate the second comparing curve;
wherein a third predetermined control signal corresponds to the third predetermined power, and the difference between the first power and the first predetermined power is substantially equivalent to a difference between the second predetermined power and the third predetermined power.

10. An apparatus for controlling power utilized by an optical disc drive during recording, comprising:
means for executing a first predetermined procedure to obtain a first predetermined power corresponding to a first predetermined control signal needed by a pickup head to record the data into an optical disc;
means for receiving data comprising a plurality of first bits with a first voltage level and a plurality of second bits with a second voltage level;
means for driving the pickup head to output a first power according to the first predetermined control signal when receiving the first bits with the first voltage level;
means for calculating a difference between the first power and the first predetermined power;
means for executing a second predetermined procedure to obtain a second predetermined control signal corresponding to a second predetermined power needed by the pickup head to record the data onto the optical disc, and adjusting the second predetermined power according to the difference to generate a third predetermined power;
means for providing a first control signal to drive the pickup head to output a power substantially equivalent to a first test power;

means for providing a second control signal to drive the pickup head to output a power equal to a second test power;

means for establishing a first comparing curve according to the first and second control signals and corresponding the first test power and the second test power, wherein the first comparing curve represents a function relationship between control signals of an digital-to-analog converter and the output powers of the pickup head; and means for utilizing a second comparing curve to calculate a needed control signal corresponding to an optimum recording power, wherein the first predetermined power is the optimum recording power utilized by the optical disc drive for recording the optical disc, wherein the second comparing curve utilizes the difference to shift the first comparing curve to generate the second comparing curve;

wherein a third predetermined control signal corresponds to the third predetermined power, and a difference between the first power and the first predetermined power is substantially equivalent to a difference between the second predetermined power and the third predetermined power.

* * * * *

UNITED STATES PATENT AND TRADEMARK OFFICE
CERTIFICATE OF CORRECTION

PATENT NO. : 7,719,942 B2 Page 1 of 1
APPLICATION NO. : 11/160738
DATED : May 18, 2010
INVENTOR(S) : Che-Chieh Wang et al.

It is certified that error appears in the above-identified patent and that said Letters Patent is hereby corrected as shown below:

On sheet 4 of 5, figure 4, reference numeral 106, line 2, delete "vottage" and insert -- voltage --, therefor.

On sheet 4 of 5, figure 4, reference numeral 114, line 2, delete "valtage" and insert -- voltage --, therefor.

Signed and Sealed this

Twentieth Day of July, 2010

David J. Kappos
*Director of the United States Patent and Trademark Office*